United States Patent [19]

Martinelli

[11] Patent Number: 4,539,220

[45] Date of Patent: Sep. 3, 1985

[54] METHOD OF MANUFACTURING REINFORCED FLEXIBLE DISKS

[75] Inventor: Lawrence G. Martinelli, San Jose, Calif.

[73] Assignee: Verbatim Corporation, Sunnyvale, Calif.

[21] Appl. No.: 535,402

[22] Filed: Sep. 23, 1983

[51] Int. Cl.$^3$ ............................................. B05D 3/06
[52] U.S. Cl. ..................................... 427/44; 156/253;
427/54.1; 427/56.1; 427/128; 427/129;
427/130; 427/289
[58] Field of Search ............................... 427/127–132,
427/44, 54.1, 56.1, 289

[56] References Cited

U.S. PATENT DOCUMENTS 4,052,750 10/1977 Barber et al. ......................... 360/135
4,387,114 6/1983 Conner et al. ....................... 427/54.1

Primary Examiner—Bernard D. Pianalto
Attorney, Agent, or Firm—Thomas E. Schatzel

[57] ABSTRACT

A method of manufacturing a flexible recording disk with a reinforced aperture region comprising the steps of transferring uncured polymeric material to a printing plate having an elastomeric protrusion thereon, transferring at least a portion of the uncured polymeric material from the elastomeric protrusion to a region on a surface on a flexible magnetic material, curing the polymeric material, and cutting a flexible disk from the flexible magnetic material such that the disk has a central aperture surrounded by the region of the flexible material coated with the cured polymeric material.

15 Claims, 7 Drawing Figures

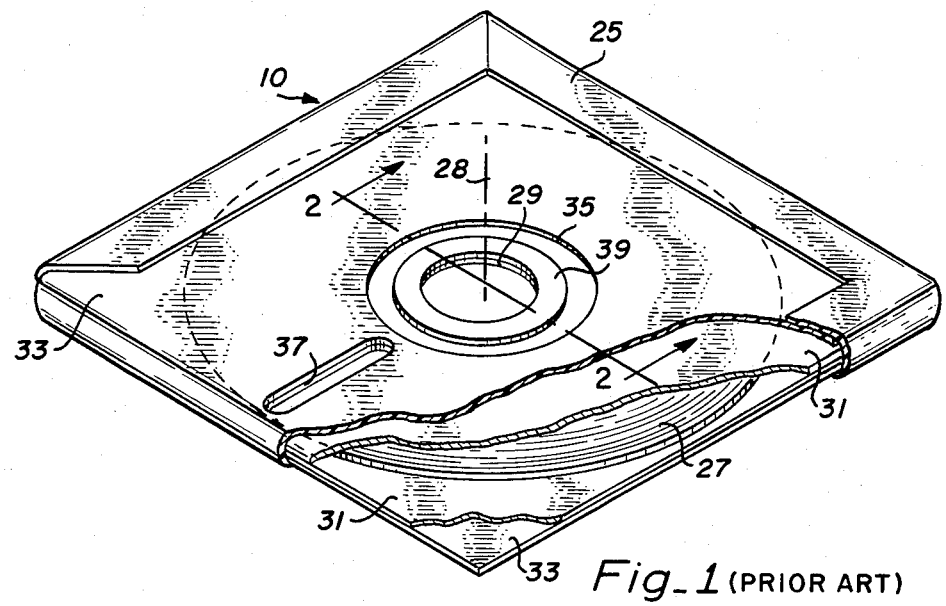
Fig_1 (PRIOR ART)
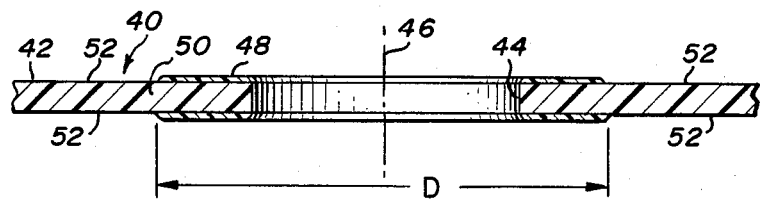
Fig_2
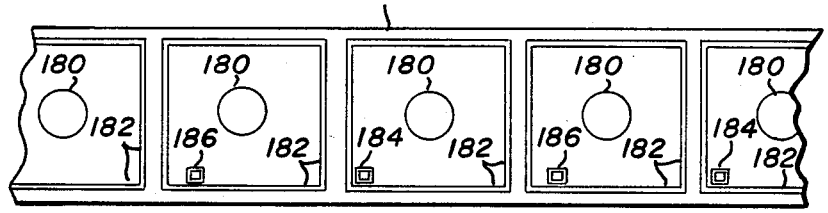
Fig_4
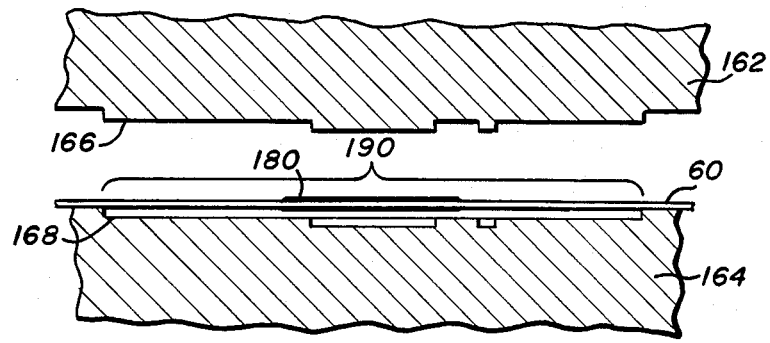
Fig_5

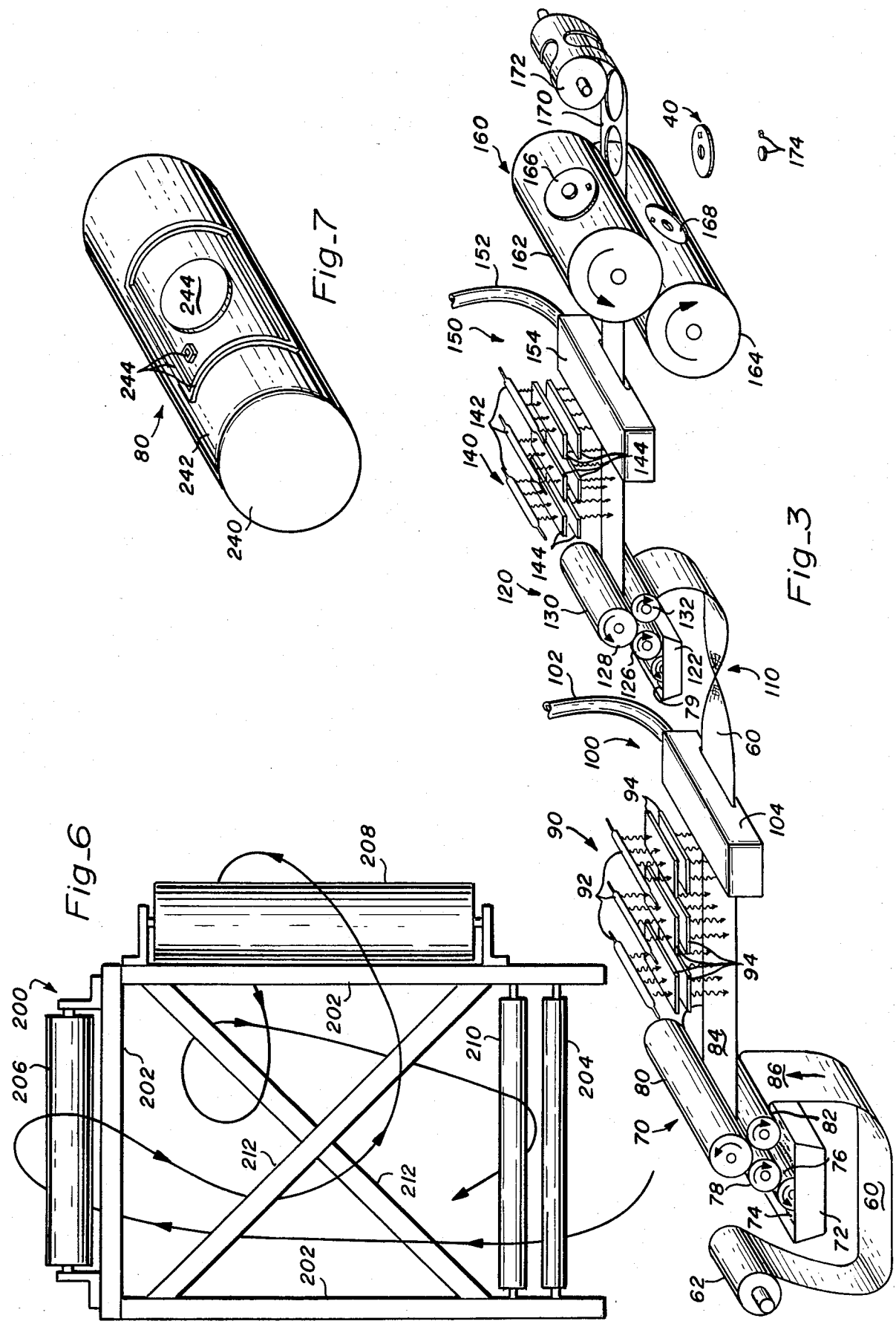

METHOD OF MANUFACTURING REINFORCED FLEXIBLE DISKS

BACKGROUND OF THE INVENTION

1. Field of the Invention

This invention relates to the field of magnetic recording media and more particularly to an improved method of manufacturing a flexible disk for digital data storage of a type having structural reinforcement in the region near the central aperture thereof.

2. Description of the Prior Art

A magnetic data storage medium comprising a circular flexible disk coated with magnetic material and enclosed in an envelope with apertures for accessing the disk has found wide use in the computer industry. Such assemblies have come to be called "floppy disk assemblies" or just "floppy disks". The flexible recording disks have a circular central aperture which is used to locate the disk with precise repeatable positioning on a spindle for rotating the disk, thereby allowing data transfer to and from the coating on the disk. Data is stored on the disk in narrow circular tracks concentric to the central aperture, so any eccentricity which results from the alignment of the disk on the spindle reduces the ability to recover recorded data. The region of the disk immediately surrounding the aperture is subject to stress and wear from both the insertion/mounting of the disk on the spindle, and the rotation of the disk. Normal usage thus results in wear and/or damage to the disk in the region of its central aperture. Ultimately this wear or damage results in inadequate alignment and unreliable data transfer during use.

Reinforcement of the region around the central aperture will extend the useful life of the disk, and various approaches have been offered for achieving such reinforcement. An aperture reinforcement achieved by adhesively bonding an annular-shaped piece of structural material to the flexible disk about its central aperture is described in U.S. Pat. No. 4,052,750 issued to Barber, et al. Fabrication of floppy disk assemblies in accordance with that disclosure requires precise alignment between the inner edges of the aperture of the disk and the annular-shaped reinforcing member. Floppy disks manufactured in accordance with the Barber, et al specification may exhibit the migration of the adhesive and result in contamination of the spindle with that adhesive.

Aperture reinforcement achieved by transferring a liquid polymer material to an annular-shaped region around the central aperture of the disk and curing the liquid to form an integral reinforcement is described in U.S. Pat. No. 4,387,114 issued to Conner, et al. While a disk manufactured in accordance with that patent avoids any possibility of adhesive migration, it still requires precise alignment of the reinforcing structure with the aperture of the disk in the manufacturing process. The process in that specification requires lifting a quantity of liquid from an annular-shaped reservoir and printing that liquid in a precise region around the central aperture of the disk, by a reciprocating motion of a flexible rubber tampon. The precise locating of the flexible rubber tampon alternately on the reservoir and the disk is both slow and expensive.

The thickness of the reinforcing structure on the disk affects the clamping pressure in common spindle designs. The thinner the reinforcement, the less the clamping force varies from the expected clamping force attained with disks without reinforcement. It is therefore preferable to minimize the thickness of the reinforcing structure, so long as sufficient structural reinforcement is attained. The Conner, et al specification refers to a maximum thickness between 0.0003 and 0.0005 inches for the reinforcement on the disk. This is thinner than that which can be attained with the structure disclosed by Barber, et al, which results in a total increase in the thickness of the disk of up to 0.016 inches if both sides of disk are reinforced. A thinner reinforcement allows more consistency with the dimensions of unreinforced disks for which the spindles were originally designed.

SUMMARY OF THE PRESENT INVENTION

An object of the present invention is to provide a method of manufacturing flexible recording disks with reinforced aperture regions which is faster than manufacturing methods of the prior art.

It is a further object of the present invention to provide a method of manufacturing flexible recording disks with integral aperture reinforcement which requires less precision in placement of the reinforcing structure than manufacturing methods of the prior art.

It is a further object of the present invention to provide a method of manufacturing flexible recording disks which produces consistent, accurate registration between the aperture inside diameter of the disk and a matching aperture inside diameter of the reinforcement.

It is a further object of the present invention to provide a method of manufacturing flexible recording disks with improved surface smoothness on the inside surface of the central apertures.

It is a further object of the present invention to provide a method of manufacturing flexible recording disks with structural reinforcement around the central aperture of the disk wherein the total dimensional increase in the thickness of the reinforced disk does not exceed 0.001 inches more than the thickness of the disk without such reinforcement.

It is a further object of the present invention to provide a method of manufacturing flexible recording disks with reinforced aperture regions from long webs of magnetic media material at a rate exceeding 1,000 disks per minute per manufacturing process installation.

Briefly, the manufacturing method of the present invention begins with a long thin web of magnetic recording material comprising a structural center layer and a magnetizable coating on both sides thereof. The web is coated in selective portions of both sides in specific patterns with a thin coating of a thickness between 0.0001 and 0.0005 inch of a thermal setting polymeric material by a flexographic printing process. The thermal setting polymeric material is then cured so as to become a polymerized structural reinforcement of the web. Flexible disks for use in floppy disk assemblies used for magnetic data storage are then fabricated from the web by a punching operation. The punching operation is performed with the web positioned so as to locate the center aperture of the disk approximately centered in a circular region reinforced by the polymeric coating.

The sequence of printing, curing and punching is performed in conjunction with a continuous movement of the web, thereby lending itself to the production of disks at rates as high as 2,000 flexible disks per minute. Since the central aperture is punched through the web after the reinforcing polymer has been applied and cured, alignment of the aperture through the reinforcing material with the aperture through the magnetic recording material is automatic.

An advantage of the present invention is that it provides a method of manufacturing flexible recording disks with reinforced aperture regions which is faster than manufacturing methods of the prior art.

It is a further advantage of the present invention that it provides a method for manufacturing flexible recording disks with integral aperture reinforcement which requires less precision in placement of the reinforcing structure than the manufacturing methods of the prior art.

It is a further advantage of the present invention that it provides a method of manufacturing flexible recording disks which produces consistent, accurate registration between the aperture inside diameter of the disk and a matching aperture inside diameter of the reinforcement.

It is a further advantage of the present invention that it provides a method of manufacturing flexible recording disks with improved surface smoothness on the inside surface of the central apertures.

It is a further advantage of the present invention that it provides a method of manufacturing flexible recording disks with structural reinforcement around the central aperture of the disk wherein the total dimensional increase in the thickness of the reinforced disk does not exceed 0.001 inch more than the thickness of the disk without such reinforcement.

It is a further advantage of the present invention that it provides a method of manufacturing flexible recording disks with reinforced aperture regions from long webs of magnetic media material at a rate exceeding 1,000 disks per minute per manufacturing process installation.

These and other objects and advantages of the present invention will no doubt become obvious to those of ordinary skill in the art after having read the following detailed description of the preferred embodiment which is illustrated in the various drawing figures.

IN THE DRAWING

FIG. 1 is a perspective view of a floppy disk assembly incorporating a flexible disk provided with structural reinforcement in the region of the central aperture in accordance with the prior art for such apparatus;

FIG. 2 is a cross-sectional view of a section of a flexible disk without jacket, taken along line 2—2 of FIG. 1 except that the reinforcement shown is of the type produced by the method of the present invention;

FIG. 3 is a diagrammatical view of a method of manufacturing flexible disks with integral reinforcement of the aperture regions in accordance with the present invention;

FIG. 4 is a top elevational view of a section of web from which flexible disks are manufactured in accordance with the method of the present invention, shown as it would appear after partial completion of the method of the present invention;

FIG. 5 is a cross-sectional diagrammatic view of a punch and die, shown in a flattened configuration for illustrative purposes, illustrating the equivalent position of web alignment during the punching process;

FIG. 6 is a front elevational view of a web inversion mechanism which may be used with implementation of the method of the present invention; and FIG. 7 is a perspective view of a printing plate cylinder used in the process of the present invention.

DETAILED DESCRIPTION OF THE PREFERRED EMBODIMENT

FIG. 1 illustrates a floppy disk assembly constructed in accordance with the prior art and referred to by the general reference numeral 10. The assembly 10 includes an envelope 25 enveloping a flexible disk 27. Disk 27 is circular in shape, has a central axis 28 normal to the plain of its surface, and has a circular central aperture 29 centered around axis 28. Envelope 25 is formed by bonding a porous, low-friction liner 31 to an outer layer 33 of solid plastic, and shaping it to envelop disk 27. The envelope 25 has a circular aperture 35 which is larger than, and approximately concentric to, aperture 29 of disk 27, and a pair of eliptical apertures 37 located opposite each other on surfaces of envelope 25 (bottom aperture not shown). A reinforcing ring 39 is bonded to disk 27 with axis 28 at its center, forming a reinforcement about central aperture 29.

FIG. 2 illustrates the central portion of a reinforced flexible disk referred to by the general reference number 40. Flexible disk 40 comprises a flexible magnetic recording material 42 with a central aperture 44 centered around an axis 46 which is the central axis of disk 40, and a polymeric coating 48 on magnetic recording material 42 in the region surrounding aperture 44. Magnetic recording material 42 comprises a structural center layer 50 made of a plastic film such as polyester, and a magnetizable coating 52 on both sides of the structural layer 50. Polymeric coating 48 has a thickness between 0.0001 and 0.0005 inch when disk 40 is manufactured in accordance with the preferred embodiment of the process of the present invention. The width of the region where polymeric coating is located is not very critical, but should be sufficiently large to provide reinforcement in the entire area of the clamp of the disk drive that it is to be operated with, and sufficient small so as to not extend into the region where data is to be recorded. It is preferred that the region of coating 48 cover a circular area of a diameter D sufficiently larger than the diameter of aperture 35 of envelope 25 such that with movement of disk 40 of FIG. 2 in jacket 25 of FIG. 1, and with allowances for tolerance in the concentricity of the outer diameter of coating 48 with aperture 44, only the region of disk 40 coated with polymeric coating 48 will be visible through aperture 35 of envelope 25. In the preferred embodiment, disk 40 is produced with diameter D of coating 48 approximately 1.75 inches.

FIG. 3 illustrates the sequence of the method of the present invention. A long web 60 of flexible magnetic recording material 42 extends throughout the various stations of the process of the present invention, with the steps of the process being performed as the web moves from left to right through the stations illustrated in FIG. 3. Web 60 is a long strip of magnetic recording material 42, approximately six inches wide, and 0.003 inch thick stored on a roll 62. From roll 62, web 60 passes through a first printing station referred to by the general reference numeral 70. First printing station 70 is a flexographic printing apparatus, and includes a polymeric material reservoir 72 containing a quantity of uncured liquid polymeric material 74, a fountain roller 76, a metering roller 78, a printing plate cylinder 80, and an impression cylinder 82. Web 60 passes between printing plate cylinder 80 and impression cylinder 82 with a first surface of the flexible magnetic recording material 42 of web 60 facing cylinder 80, and a second surface of material 42 of web 60 facing cylinder 82.

Polymeric material 74 may be any of a wide variety of polymer based thermosetting resins which are suitable for use as a coating material and which exhibit the necessary mechanical properties when cured to provide structural reinforcement of the disk 40. Materials such as polyesters, epoxies, polyurethanes and silicones are among the various materials which may be selected for use as polymeric material 74. When selecting the resin/curing agent system to be used for polymeric material 74, good results can be attained with a solventless ultraviolet light-cured system. Such a system is relatively stable in its uncured condition and therefore does not introduce variation in viscosity and coating thickness on the finished product as a result of handling and variation in the time material 74 is in reservoir 72. Although systems with solvents and/or systems which will cure at room temperature could be utilized, significant precautions would then be required to assure uniformity of the finished product, including close control over shelf life, control over the time in reservoir 72 and frequent cleaning of the various elements of the first printing station 70.

From first printing station 70, web 60 passes through a first curing station referred to by the general reference numeral 90. First curing station 90 includes a set of three mercury vapor lamps 92, each of which is capable of providing substantial amounts of ultraviolet radiation in both of two regions of the light spectrum. One such region is centered around a wave length of 254 nanometers, and the other is centered around a wave length of 365 nanometers. Although other wave lengths may be utilized, experience has shown that for many polymeric materials which can be utilized for polymeric material 74, and with application in the thickness range desired for polymeric coating 48, the radiation in the region around a wave length of 254 nanometers effectively cures the surface of coating 48, and the radiation in the region around a wave length of 365 nanometers effectively penetrates the surface and cures the underlying thickness of coating 48. The amount of ultraviolet light supplied to web 60 from mercury vapor lamps 92 must be related to the speed at which web 60 moves. The more light supplied, the faster the cure and therefore the faster web 60 can move. By utilization of three separate mercury vapor lamps 92 and by providing for two intensity ranges on each of lamps 92, a variety of total light intensities can be obtained. It is therefore possible to operate the process at a multiplicity of rates of travel of web 60, and thus a multiplicity of rates of manufacturing of disks 40. Easy selectability of the rate of manufacture provides the advantage of allowing the user to optimize the rate for different conditions. Higher rates of manufacturing increase facility utilization and somewhat reduce per unit labor costs, but in the event of a malfunction, tends to increase the amount of scrap created before the problem is discovered.

Lamps 92 are utilized for their ultraviolet output, but will also provide significant amounts of radiation of other wavelengths. A pair of filters 94 are associated with each of lamps 92, with filters 94 passing the desired wavelengths, but blocking other wavelengths. Of particular importance, filters 94 are built to absorb infrared radiation so as to prevent excessive heating of web 60, and thereby causing heat distortion. Filters 94 can be made of optically pure quartz. Air should be circulated over lamps 92 and refrigerated air should be circulated between the surfaces of filters 94. Shutters may be added to block the light from the web 60 if it is likely that the web 60 will ever be motionless with lamps 92 on.

A first cooling station referred to by the general reference numeral 100 surrounds the web 60 following first cooling station 90. First cooling station 90 includes an inlet pipe 102, and a shroud 104. Inlet pipe 102 provides refrigerated air to shroud 104 which is constructed to direct the refrigerated air across the surfaces of web 60.

A web inversion station 110 provides a means for inverting web 60. An apparatus for facilitating the inversion of web 60 will be discussed below when referring to FIG. 6.

Following the web inversion station 110, web 60 passes through a second printing station referred to by the general reference numeral 120 which is substantially identical to first printing station 70. Second printing station 120, like first printing station 70, is a flexographic printing apparatus, and includes a polymeric material reservoir 122 corresponding to reservoir 72, a fountain roller 126 corresponding to fountain roller 76, a metering roller 128 corresponding to metering roller 78, a printing plate cylinder 130 corresponding to printing plate cylinder 80, and an impression cylinder 132 corresponding to impression cylinder 82. Reservoir 122, like reservoir 72, contains uncured polymeric material 74.

Following second printing station 120, web 60 passes through a second curing station referred to by the general reference numeral 140, which is substantially similar to first curing station 90. Second curing station 140 includes a set of three mercury vapor lamps 142, and a pair of filters 144 associated with each of lamps 142. Lamps 142 and filters 144 correspond to lamps 92 and filters 94, respectively, of first curing station 90. Shutters may be provided to separate web 60 from lamps 142 if lamps 142 will ever be on while web 60 is motionless.

A second cooling station referred to by the general reference numeral 150 follows second curing station 140 along the path of web 60. Second cooling station 150 is substantially similar to first cooling station 100 and includes an inlet pipe 152 and a shroud 154 corresponding to inlet pipe 102 and shroud 104 of first cooling station 100.

Following second cooling station 150, web 60 passes through a rotary punching station referred to by the general reference numeral 160. Rotary punching station 160 includes a punch roller 162 and a die roller 164, with punch roller 162 having a punch 166 thereon and die roller 164 having a die 168 therein. Rollers 162 and 164 are aligned such that punch 166 mates with die 168 through the area occupied by web 60. Following rotary punching station 160, a ladder 170 comprising the web 60 after removal of the portion thereof which formed flexible recording disk 40 is rolled up to form a ladder roll 172. A plurality of punch residue 174 are also produced from web 60 by punching station 160.

FIG. 4 illustrates a typical configuration of web 60 including selected portions of its surface coated with polymeric coating 48 applied at either first printing station 70 or second printing station 120. (Stations 70 and 120 apply the same configuration of coating on opposite sides of web 60.) Web 60 has a plurality of circular shaped reinforcement areas 180 comprising polymeric coating 48 bonded to the surface of web 60, a plurality of large rectangular outlines 182, a plurality of small rectangular outlines 184 and a plurality of small rectangular outlines 186, all comprising polymeric coating 48. Circular shaped reinforcement areas 180, large rectangular outlines 182 and small rectangular outlines 184 and 186 are positioned on web 60 such that flexible disks 40 punched from web 60 concentric to the central axis of areas 180 will be entirely of portions of web 60 contained within large rectangular outlines 182 and will not include the areas prescribed by small rectangular outlines 184 and 186. Small rectangular outlines 184 are located one within each of the areas prescribed by each alternate large rectangular outline 182, and small rectangular outlines 186 are located one in each of the areas prescribed by the remaining large rectangular outlines 182. The position of small rectangular outlines 186 are offset from the relative positions within large rectangular outlines 182 of small rectangular outlines 184 by the width of small rectangular outlines 186, in the direction of travel of web 60.

FIG. 5 illustrates the cutting of disk 40 from web 60 by a punching operation utilizing punch roller 162 and die roller 164. A region 190 of web 60 represents a portion of web 60 from which disk 40 is formed by the punching action of punch 166 with die 168.

FIG. 6 illustrates an inversion mechanism referred to by the general reference numeral 200 which can be utilized to facilitate the method of manufacturing of the present invention. Mechanism 200 may thus be used at web inversion station 110 of FIG. 3. Mechanism 200 includes a supporting frame 202, an input roller 204, a top transitional roller 206, a side transitional roller 208, an output roller 210, and a pair of air cushion transitional bars 212. Rollers 204, 206, 208 and 210 are rotatably mounted on support frame 202, and transitional air cushion bars 212 are rigidly mounted on support frame 202.

FIG. 7 provides greater detail of printing plate cylinder 80 which is described above with reference to FIG. 3. Printing plate cylinder 80 comprises a rotatable cylindrical base 240 with a cylindrical surface 242 thereon, and an elastomeric protrusion 244 in a pattern for printing the uncured liquid polymeric material 74 onto the surface of web 60. A typical configuration of printing plate cylinder 80 will have the entire cylindrical surface 242 covered with elastomeric material with elastomeric protrusion 244 an integral part thereof. In fabricating elastomeric protrusion 244 to print a desired pattern, adjustments must be made to the shape to compensate for the cylindrical curvature of surface 242. The fabrication of printing plate cylinder 80 can be done with a relatively small diameter cylindrical base 240 and a single pattern elastomeric protrusion 244, or with a larger diameter and multiple repeating patterns within elastomeric protrusion 244. Experience has shown that for the manufacture of five and one-quarter inch diameter flexible recording disks, two repeating patterns within elastomeric protrusion 244 results in a diameter for cylindrical base 240 of slightly more than three and one-half inches, a size which has been fairly easy to use.

Turning now to FIG. 3, the process of manufacturing a flexible recording disk 40 with a reinforced central aperture will be discussed. The manufacturing method of the present invention is a continuous process in which web 60 of flexible magnetic recording material 42 proceeds from a roll 62 at the beginning of the process to a ladder roll 172 at the end of the process with that latter roll 172 being a roll of leftover flexible magnetic recording material 42 from which flexible recording disks 40 have been removed. From roll 62 of web 60, the web 60 travels over impression cylinder 82 where it is imprinted with a pattern of uncured liquid polymeric material 74 by elastomeric protrusion 244 of printing plate cylinder 80. Elastomeric protrusion 244 is coated with uncured liquid polymeric material 74 by having such material transferred from metering roller 78 which is coated with material 74 by the transfer of such material from fountain roller 76 which is partially submerged in polymeric material reservoir 72. By rotatably contacting protrusion 244 of printing plate cylinder 80 with web 60, a quantity of uncured liquid polymeric material is transferred to the contacted surface of 160.

A typical pattern of the polymeric material 74 printed on web 60 is illustrated in FIG. 4. The printed pattern of polymeric material 74 on the surface of web 60 is then cured at first curing station 90 at which ultraviolet light is radiated through filters 94 onto web 60 to provide the energy necessary to effect the curing process. Cooling of the lamps and filters is necessary to avoid excessive heat transfer to web 60.

Web 60 is cooled, to remove the heat which is absorbed in the curing process. Cool air is circulated over web 60 at the curing station, and refrigerated air is blown over the surface of web 60 immediately following curing station 90 at cooling station 100.

Following cooling station 100, web 60 is inverted at web inversion station 110. Inversion mechanism 200, as illustrated in FIG. 6, may be utilized for inverting web 60 at web inversion station 110. The threading arrows shown in FIG. 6 illustrate how the web is installed on mechanism 200. The use of air cushion transitional bars instead of rollers for the 45° bends reduces sensitivity to alignment, and the resulting tendency for the web to shift laterally at transitions. Other mechanisms could be utilized to invert the web, but it is preferable to have one in which the length of web within inversion station 100 is constant so that proper registration of web 60 between first printing station 70 and second printing station 120 is easily maintained.

Following web inversion station 110, the web passes on to second printing station 120 which functions in substantially identical fashion as printing station 70, except that it prints the pattern of uncured liquid polymeric material on the opposite surface of web 60 from the surface of web 60 printed at first printing station 70. The printing on a second surface 86 of web 60 at printing station 120 must be such as to print the pattern directly opposite the pattern on first surface 84 of web 60. Large rectangular outlines 182 and small rectangular outlines 184 and 186 can be used to help establish the proper registration between printing station 70 and 120.

Following second printing station 120, the polymeric material is cured with ultraviolet light at curing station 140 in a manner substantially the same as the curing at curing station 90, and the webs is then cooled at cooling station 150 which functions substantially the same as cooling station 100.

Flexible recording disks 40 are next cut from web 60 by a rotary punching process at rotary punching station 160 wherein the moving web 60 is punched as punch 166 passes through web 60 into die 168. Rotary punching station and web 60 must be properly registered so as to result in concentricity of the central circular aperture 29 of flexible recording 40 with circular shaped reinforcing area 180. Aperture 29 is punched such that its diameter, which represents the location of a cutting surface of die 168 at the time of punching, falls in the reinforcement area 180, and thus the aperture is created through disk 40 and polymeric coating 48 in the same operation. Polymeric coating 48 actually aids in the punching operation and causes the surface of aperture 29 through disk 40 to be smoother than if coating 48 were not present.

Alternate embodiments of the present invention could include use of electron or infrared light radiation instead of ultravoilet light radiation for curing polymeric material 74 on web 60 at curing stations 90 and 140.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A method of manufacturing a flexible recording disk with a reinforced aperture region comprising the steps of:

transferring a quantity of uncured polymeric material from a reservoir to an elastomeric protrusion of a printing plate, said elastomeric protrusion having a surface thereon which is the shape of a pattern for printing said polymeric material;

transferring at least a portion of said quantity of uncured polymeric material from said elastomeric protrusion of said printing plate to a first surface of a flexible magnetic material, the polymeric material so transferred being in the shape of said pattern for printing said polymeric material;

curing the polymeric material on said first surface of said flexible magnetic material;

cutting a flexible disk from the flexible magnetic material with a central aperture of the flexible disk in a region of the magnetic material coated with the cured polymeric material;

whereby said disk is produced in a configuration having structural reinforcement provided in the region of its central aperture by a coating of cured polymeric material.

2. The method of manufacturing a flexible recording disk of claim 1, further comprising the step of cooling the flexible magnetic material by contacting moving air with the flexible magnetic material.

3. The method of manufacturing a flexible recording disk of claim 2 wherein said moving air is cooled below room temperature (refrigerated) prior to its contact with the flexible magnetic material.

4. The method of manufacturing a flexible recording disk of claim 1 further comprising the steps of:

transferring a quantity of uncured liquid polymeric material from a second reservoir to an elastomeric protrusion of a second printing plate, said elastomeric protrusion of said second printing plate having a surface thereon which is the shape of a second pattern for printing said polymeric material;

transferring at least a portion of said quantity of uncured liquid polymeric material from said elastomeric protrusion of said second printing plate to a second surface of the flexible magnetic material opposite the portion of said first surface of the flexible magnetic material previously coated with said polymeric material, the polymeric material so transferred to said second surface of the flexible magnetic material being in the shape of said second pattern for printing said polymeric material;

curing the polymeric material on said second surface of the flexible magnetic material;

whereby said flexible recording disk is produced in a configuration structural reinforcement provided on both of its surfaces by a coating of cured polymeric material.

5. The method of manufacturing a flexible recording disk of claim 4, further comprising the step of inverting the flexible magnetic material after the step of curing the polymeric material on said first surface of the flexible magnetic material, and before the step of transferring the substantial portion of said quantity of uncured polymeric material from said elastomeric protrusion of said second printing plate to said second surface of the flexible magnetic material.

6. The method of manufacturing a flexible recording disk of claim 1 wherein the step of transferring the substantial portion of said quantity of uncured liquid polymeric material from said elastomeric protrusion of said printing plate to said first surface of the flexible magnetic material is accomplished by moving the flexible magnetic material across a rotating cylinder, and simultaneously rotating the surface of said elastomeric protrusion of said printing plate, contacting it with, and subsequently disengaging it from, said first surface of the flexible magnetic material, with the surface velocity of said elastomeric protrusion of said printing plate matching the surface velocity of said first surface of the flexible magnetic material while said elastomeric protrusion of said printing plate is contacting said first surface of the flexible magnetic material.

7. The method of manufacturing a flexible recording disk of claim 1 wherein the step of curing the polymeric material on said first surface of the flexible magnetic material is accomplished by irradiating the polymeric material with ultraviolet light.

8. The method of manufacturing a flexible recording disk of claim 4 wherein the steps of curing the polymeric material on said first surface of the flexible magnetic material, and of curing the polymeric material on said second surface of the flexible magnetic material are both accomplished by irradiating the polymeric material with ultraviolet light.

9. The method of manufacturing a flexible recording disk of claim 1 wherein the step of curing the polymeric material on said first surface of the flexible magnetic material is accomplished by irradiating the polymeric material with electrons.

10. The method of manufacturing a flexible recording disk of claim 4 wherein the steps of curing the polymeric material on said first surface of the flexible magnetic material, and of curing the polymeric material on said second surface of the flexible magnetic material are both accomplished by irradiating the polymeric material with electrons.

11. The method of manufacturing a flexible recording disk of claim 1 wherein the step of curing the polymeric material on said first surface of the flexible magnetic material is accomplished by irradiating the polymeric material with infrared light.

12. The method of manufacturing a flexible recording disk of claim 4 wherein
the steps of curing the polymeric material on said first surface of the flexible magnetic material and of curing the polymeric material on said second surface of the flexible magnetic material are both accomplished by irradiating the polymeric material with infrared light.

13. The method of manufacturing a flexible recording disk of claim 1 wherein
the step of cutting the flexible disk from the flexible magnetic material is accomplished by moving the flexible magnetic material across a rotating die and punching the disk by rotating a punch through the magnetic material into said rotating die.

14. The method of manufacturing a flexible recording disk of claim 5 further comprising the steps of:
cooling the flexible magnetic material by contacting the flexible magnetic material with moving air having a temperature below room temperature; and
wherein said steps of curing the polymeric material on said first and second surfaces of the flexible magnetic material are accomplished by irradiating the polymeric material with ultraviolet light; and
said step of cutting the flexible disk from the flexible magnetic material is accomplished by moving the flexible magnetic material across a rotating die and punching the disk by rotating a punch through the magnetic material into said rotating die.

15. A method of manufacturing flexible recording disks with reinforced aperture regions comprising the steps of:
a. transferring a quantity of uncured polymeric material from a reservoir to an elastomeric protrusion of a printing plate, said elastomeric protrusion having a surface thereon which is the shape of a pattern for printing said polymeric material;
b. transferring at least a portion of said quantity of uncured polymeric material from said elastomeric protrusion of said printing plate to a first surface of a web of flexible magnetic material by moving the web of flexible magnetic material across a rotating cylinder, and simultaneously rotating the surface of said elastomeric protrusion of said printing plate, contacting it with, and subsequently disengaging it from, said first surface of the web of flexible magnetic material, with the surface velocity of said elastomeric protrusion of said printing plate matching the surface velocity of said first surface of the web of flexible magnetic material while said elastomeric protrusion of said printing plate is contacting said first surface of the web of flexible magnetic material, the polymeric material so transferred being in the shape of said pattern for printing said polymeric material;
c. curing said polymeric material on said first surface of said web of flexible magnetic material;
d. cutting a flexible disk from the web of flexible magnetic material with a central aperture of the flexible disk in a region of the magnetic material coated with the cured polymeric material, and with the cutting of the flexible disk from the disk of flexible magnetic material being accomplished by moving the web of flexible magnetic material across a rotating die and punching the disk by rotating a punch through the web of magnetic material into said rotating die;
e. repeating steps (a) through (d), utilizing previously unused portions of the web of flexible magnetic material;
whereby the flexible recording disks are produced in a configuration having structural reinforcement provided in the region of the central apertures by a coating of cured polymeric material.

* * * * *